Aug. 26, 1952 F. KESSLER 2,608,620

TELEPHONE INTERCEPT SYSTEM

Filed Nov. 19, 1947 7 Sheets-Sheet 1

INVENTOR.
FRANK KESSLER

BY

Winfred T. Powell

ATTORNEY

Aug. 26, 1952 F. KESSLER 2,608,620

TELEPHONE INTERCEPT SYSTEM

Filed Nov. 19, 1947 7 Sheets-Sheet 2

INVENTOR.
FRANK KESSLER

BY Winfred T. Powell

ATTORNEY

Aug. 26, 1952 F. KESSLER 2,608,620

TELEPHONE INTERCEPT SYSTEM

Filed Nov. 19, 1947 7 Sheets-Sheet 3

INVENTOR.
FRANK KESSLER

BY

Winfred T. Powell
ATTORNEY

INVENTOR.
FRANK KESSLER
BY
Winfred T. Powell
ATTORNEY

INVENTOR.
FRANK KESSLER
BY
Winfred T. Powell
ATTORNEY

Aug. 26, 1952 F. KESSLER 2,608,620

TELEPHONE INTERCEPT SYSTEM

Filed Nov. 19, 1947 7 Sheets-Sheet 6

INVENTOR.
FRANK KESSLER

BY

Winfred T. Powell

ATTORNEY

Aug. 26, 1952 F. KESSLER 2,608,620
TELEPHONE INTERCEPT SYSTEM
Filed Nov. 19, 1947 7 Sheets-Sheet 7

INVENTOR.
FRANK KESSLER
BY
Winfred T. Powell
ATTORNEY

Patented Aug. 26, 1952 2,608,620

UNITED STATES PATENT OFFICE 2,608,620

TELEPHONE INTERCEPT SYSTEM

Frank Kessler, Rochester, N. Y., assignor to Stromberg-Carlson Company, a corporation of New York Application November 19, 1947, Serial No. 786,831

17 Claims. (Cl. 179—27)

This invention relates to telephone systems and it more particularly pertains to automatic telephone systems including individual and party lines.

In telephone systems of the character indicated, when one of the substations associated with a party line is taken out of service or disconnected from the line for any reason, it is desirable to provide an arrangement whereby calls intended for the disconnected substation are routed to an operator's position so that the calling subscriber can be informed that the called substation is no longer in service. It is customary to refer to an arrangement of this type as intercept service, since calls directed to lines of this character are intercepted and redirected to an operator's position. Call intercepting service of this type may also be desirable in other instances when calls to substations actually in service are to be routed to an operator's position.

It is an object of the present invention to provide, in an automatic telephone system of the character described, improved apparatus of simple and economical construction which operates in a new and improved manner to intercept calls to a substation associated with an individual line or a party line and to route such calls to an operator's position.

Another object of the invention is the provision of circuit arrangements in a party line system of the code ringing type, so arranged that the control of the call intercepting apparatus is effected through a plurality of stepping relay groups, common to a plurality of intercept line circuits.

It is a further object of the invention to provide an improved circuit arrangement of the character described wherein the apparatus connected to an intercepted line circuit is reduced to a minimum, with the more complicated portion of the circuit arrangement being in a group common to a plurality of intercepted line circuits.

Another object of the present invention relates to a circuit arrangement provided in the common equipment for enabling calls to one or two parties on the same line to be intercepted.

Still a further object of the invention is the provision of a circuit arrangement whereby several individual lines may be connected in multiple to one intercepting line.

It is still a further object of the present invention to provide a ringing trip arrangement associated with the common equipment for tripping the ring on a call to an intercepted line, without operating the usual reverse battery relay in the connector, and for extending the call from the intercepted line to an operator's trunk.

Another object of the present invention is the provision of a flash key associated with the operator's trunk, whereby the operator may execute flash supervision back to the originating calling station, particularly if this calling station is a toll operator.

Further features of the invention pertain to the particular arrangement of the circuit elements whereby the above and additional features are attained.

Figure 8:
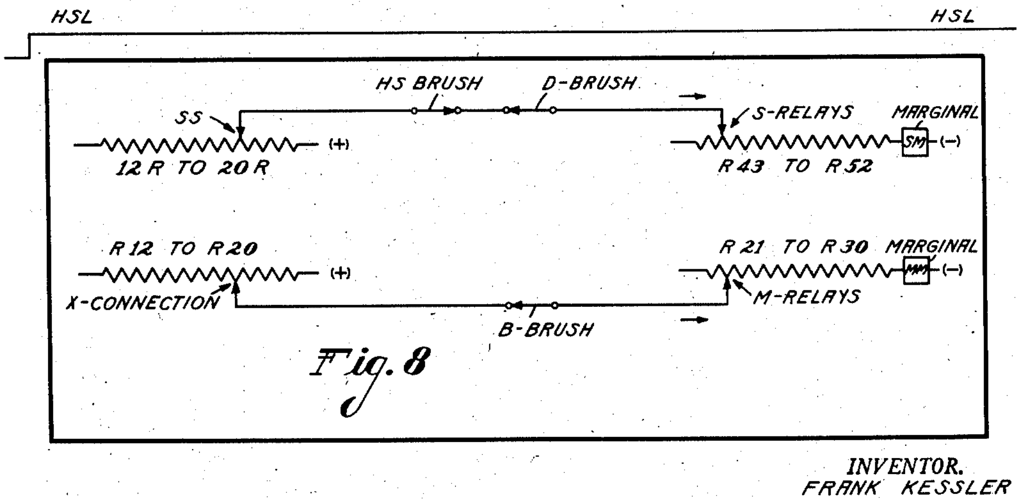

The novel features believed to be characteristic of the invention are set forth in the appended claims. The invention, both as to its organization and method of operation, together with further objects and advantages thereof will be best understood by reference to the following specification taken in connection with the accompanying drawings in which Figs. 1, 2, 3, 4, 5, 6 and 7 taken together and arranged in the order named and with correspondingly numbered or lettered lines in alignment, illustrate an intercept circuit arrangement having embodied therein the features of the invention briefly outlined above, and Fig. 8 is a schematic circuit showing how the stop relays SM and MM are operated when the associated counting relays S and M step along to insert the proper resistance in the circuit to operate the corresponding SM and MM relays in accordance with the value of the resistance selected by the station selector of the connector and the value of the resistance selected by the cross connection associated with the line on intercept, respectively.

For the purpose of simplifying the illustrations and facilitating the explanation, the various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be actually employed in practice. For example, the various relays and their contacts are illustrated in a conventional manner with all of the contacts controlled by a particular relay being associated with this relay by means of a dashed line. The negative side of the common exchange battery is indicated by a minus sign in parenthesis and the positive side of the exchange battery, which is usually grounded, is indicated by a plus sign in parenthesis.

For convenience in illustrating and describing the features of the present invention, it is assumed that it is applied to a party line telephone system of the code ringing type and furthermore that the code ringing arrangement is such as to provide for a maximum of ten stations on a party line.

In the embodiment of the invention illustrated in the drawings, a finder switch is provided and associated with the common intercept circuit, this finder switch having access to the lines with respect to which calls are to be intercepted and is arranged to operate in response to the completion of a start circuit therefor which is controlled by the operation of one of the pair of individual relays associated with a line upon which calls are to be intercepted.

In the embodiment of the invention illustrated in the present drawings, the common intercept apparatus is associated with a line connected for intercept service by means of a line finder switch, after which a pair of counting relay chains step in synchronism. One of these relay chains sequentially reduces the resistance which is normally inserted in the circuit and when this resistance is reduced to a value which, when added to the resistance connected into the circuit by the station selector, equals the operate value for the stop relay, this relay is operated. Concurrently with this operation, the other stepping relay chain sequentially reduces the resistance of the circuit included in another stop relay circuit, so that this other stop relay will be operated when the total resistance included in the circuit selected by the second counting relay chain, plus that included in the cross connection circuit which marks the station to be connected to intercept, equals the operate value for this stop relay. If both stop relays operate at the same step of the counting relay chains, the counting operation is stopped and the call is extended to the operator's circuit, in the manner and for the purpose explained in detail later.

In order to test the operation of the common intercept circuit arrangement, a test key is provided which, when operated, causes the counting relay chains to step along for a predetermined number of steps and, if the circuits are functioning properly, the stepping operation will be stopped and lamps will light as an indication that the proper number of steps were taken.

Figure 1:
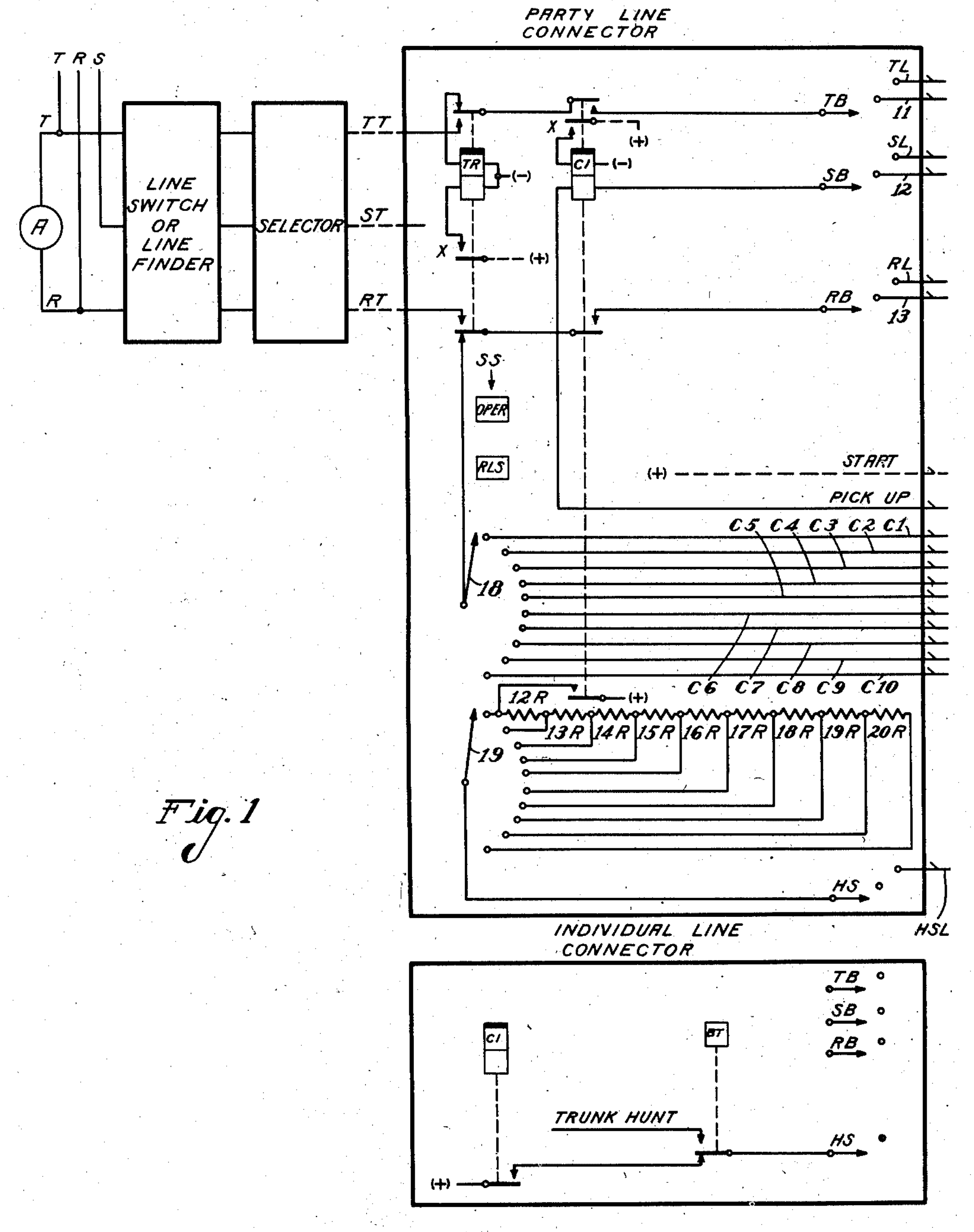
Figure 2:
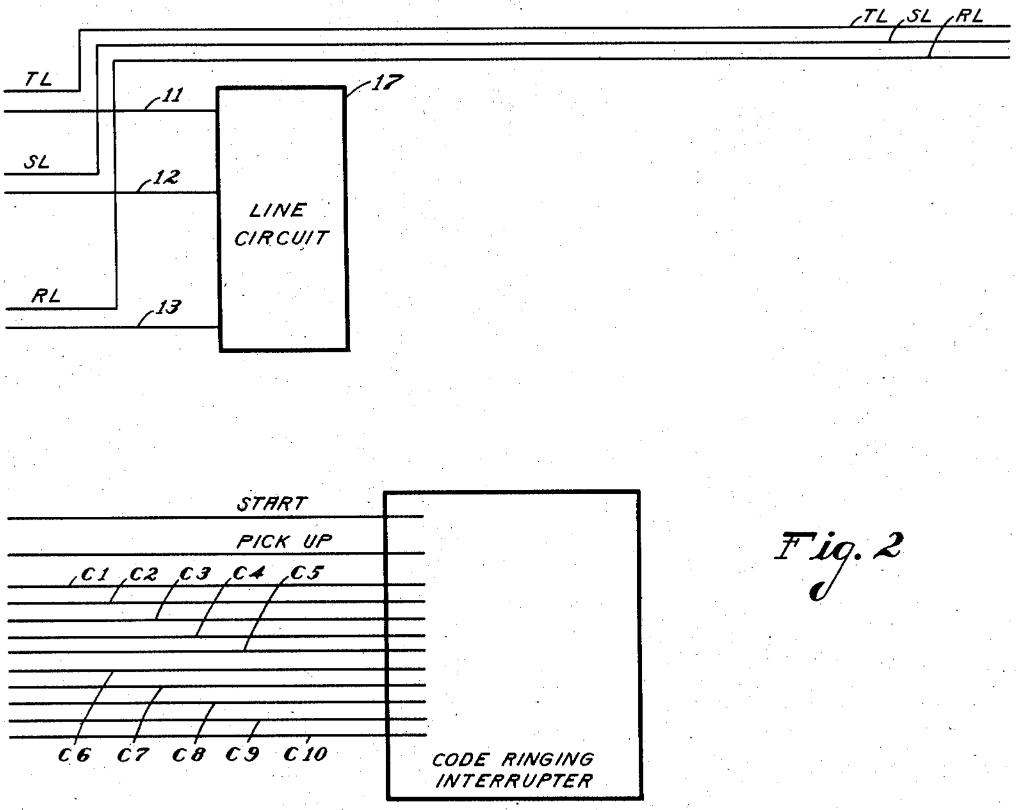
Figure 3:
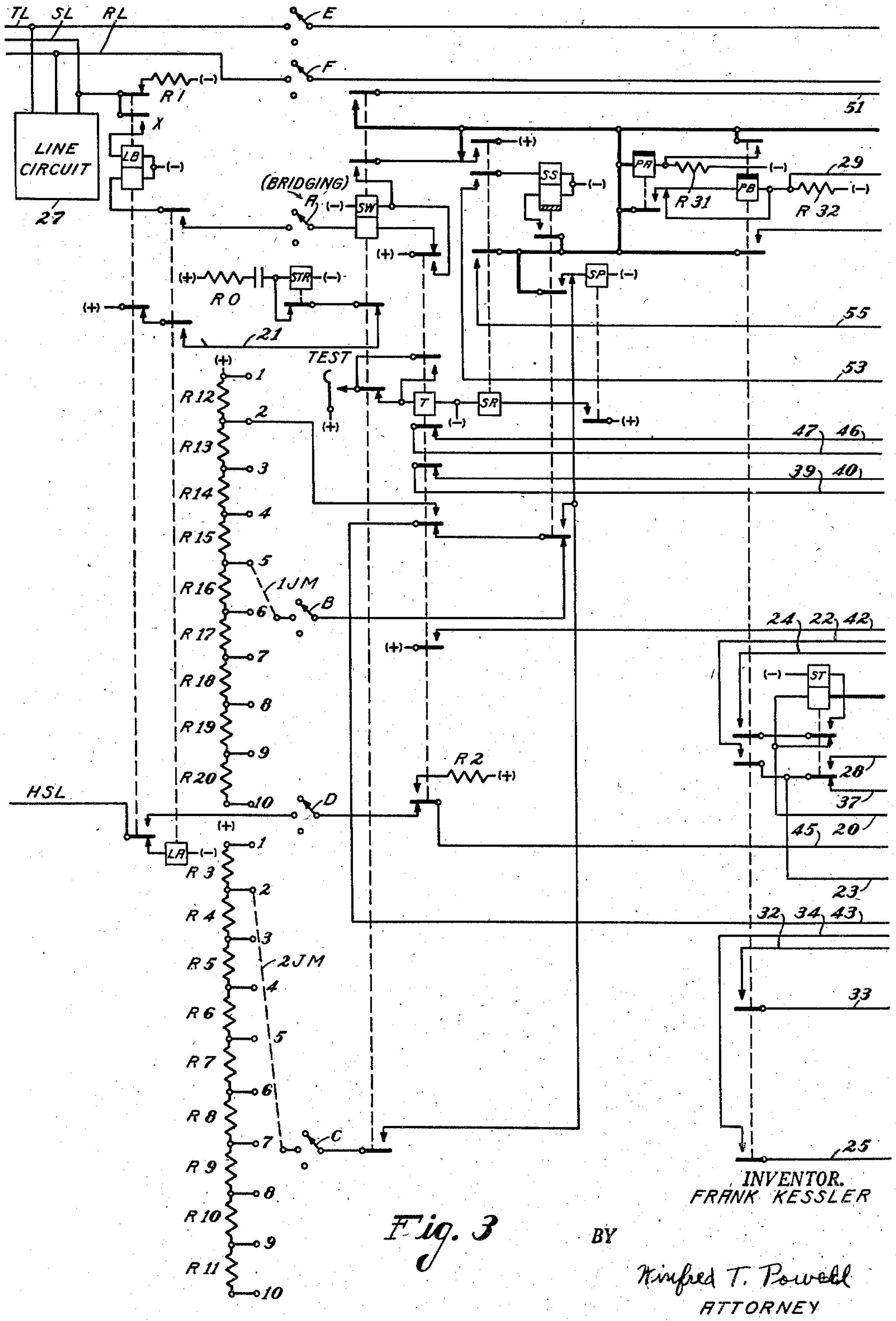
Figure 4:
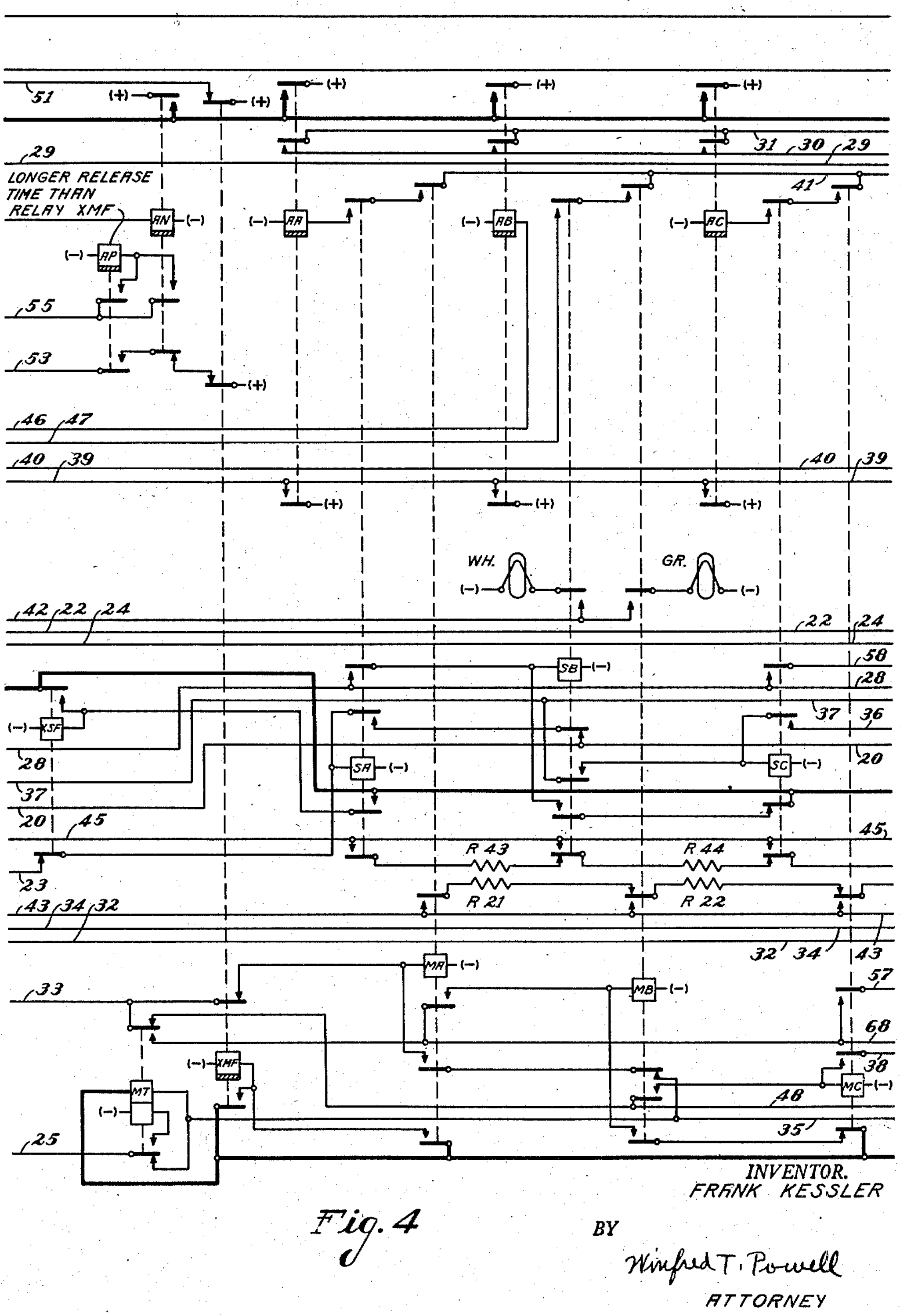
Figure 5:
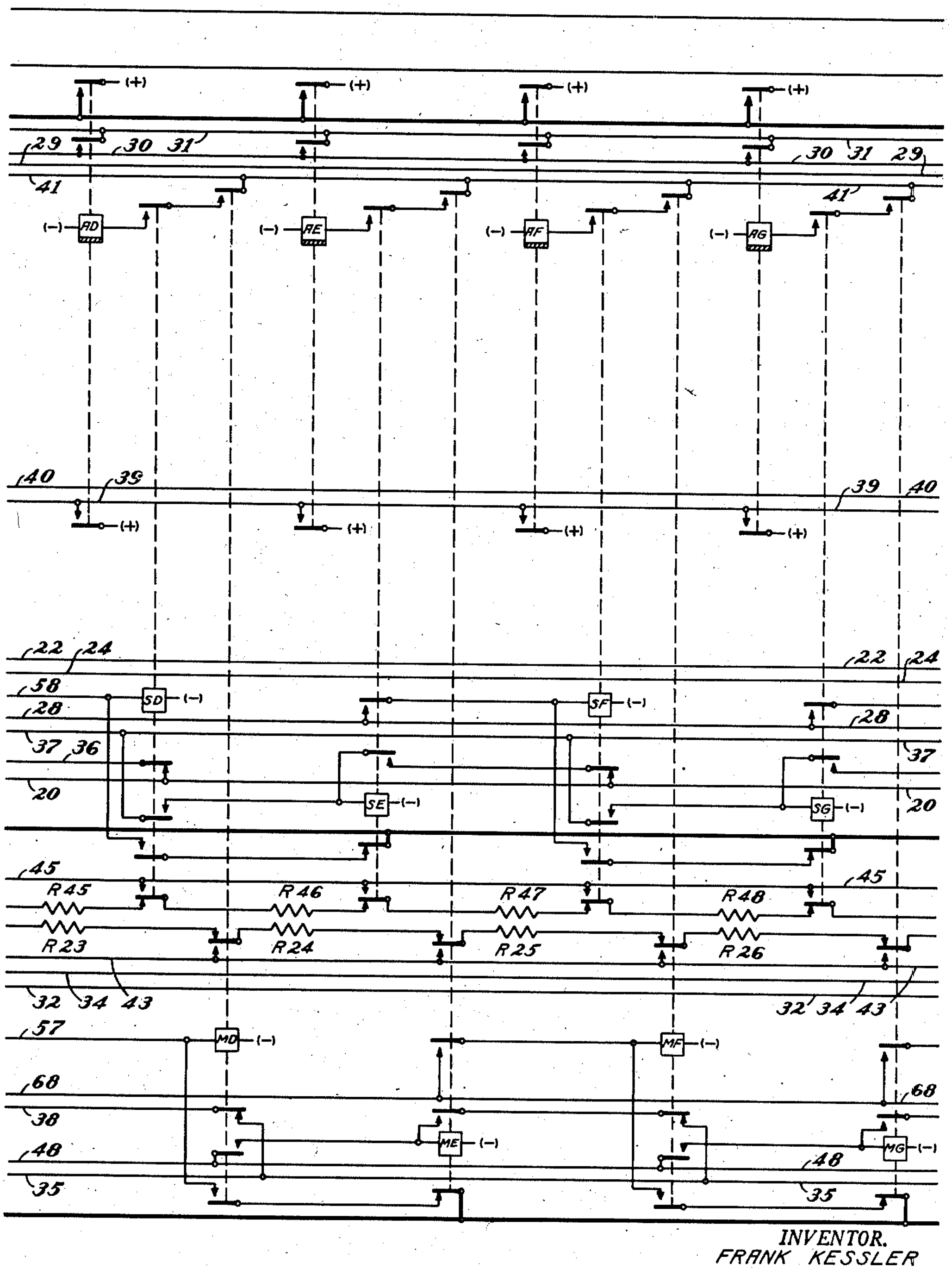
Figure 6:
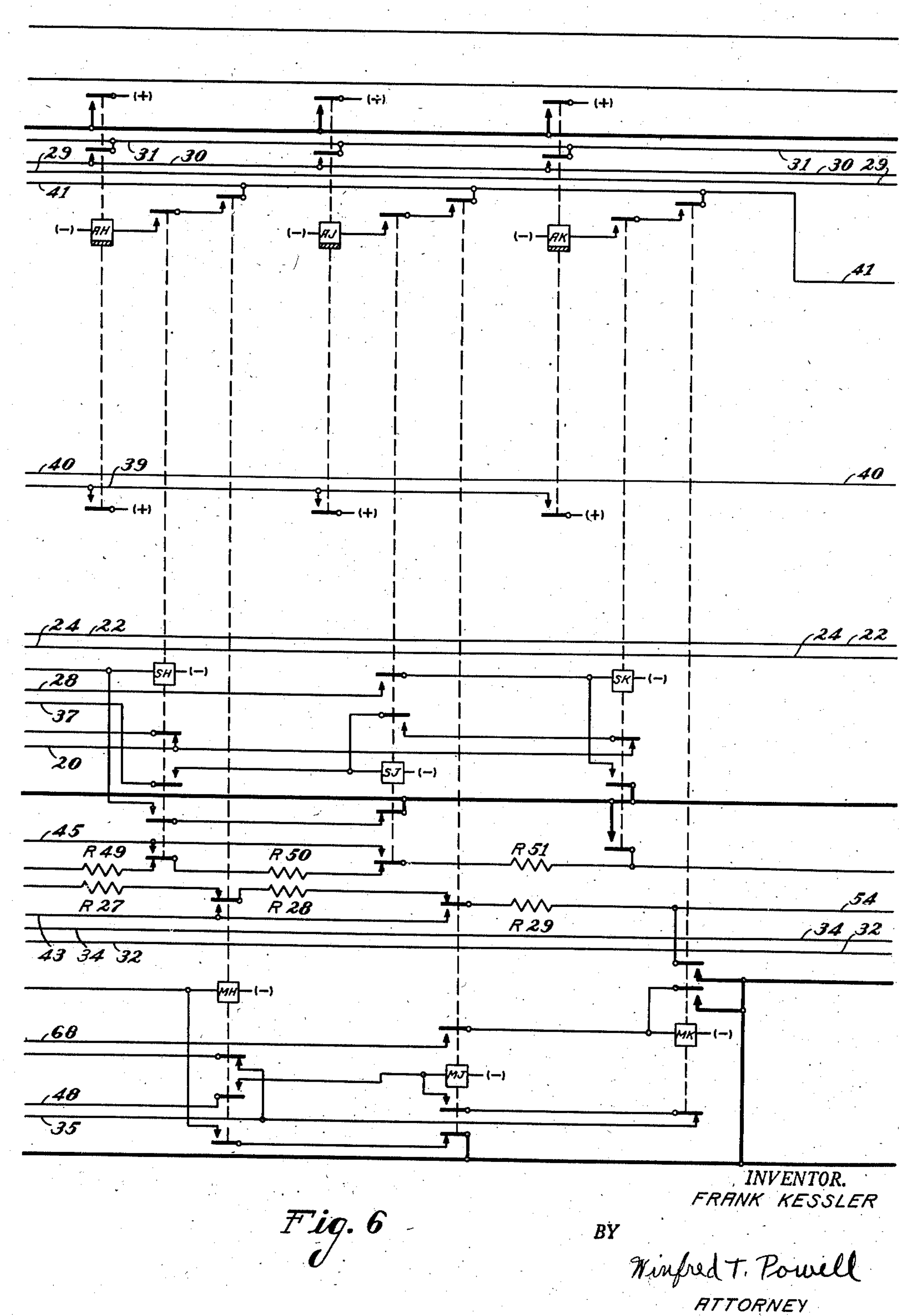
Figure 7:
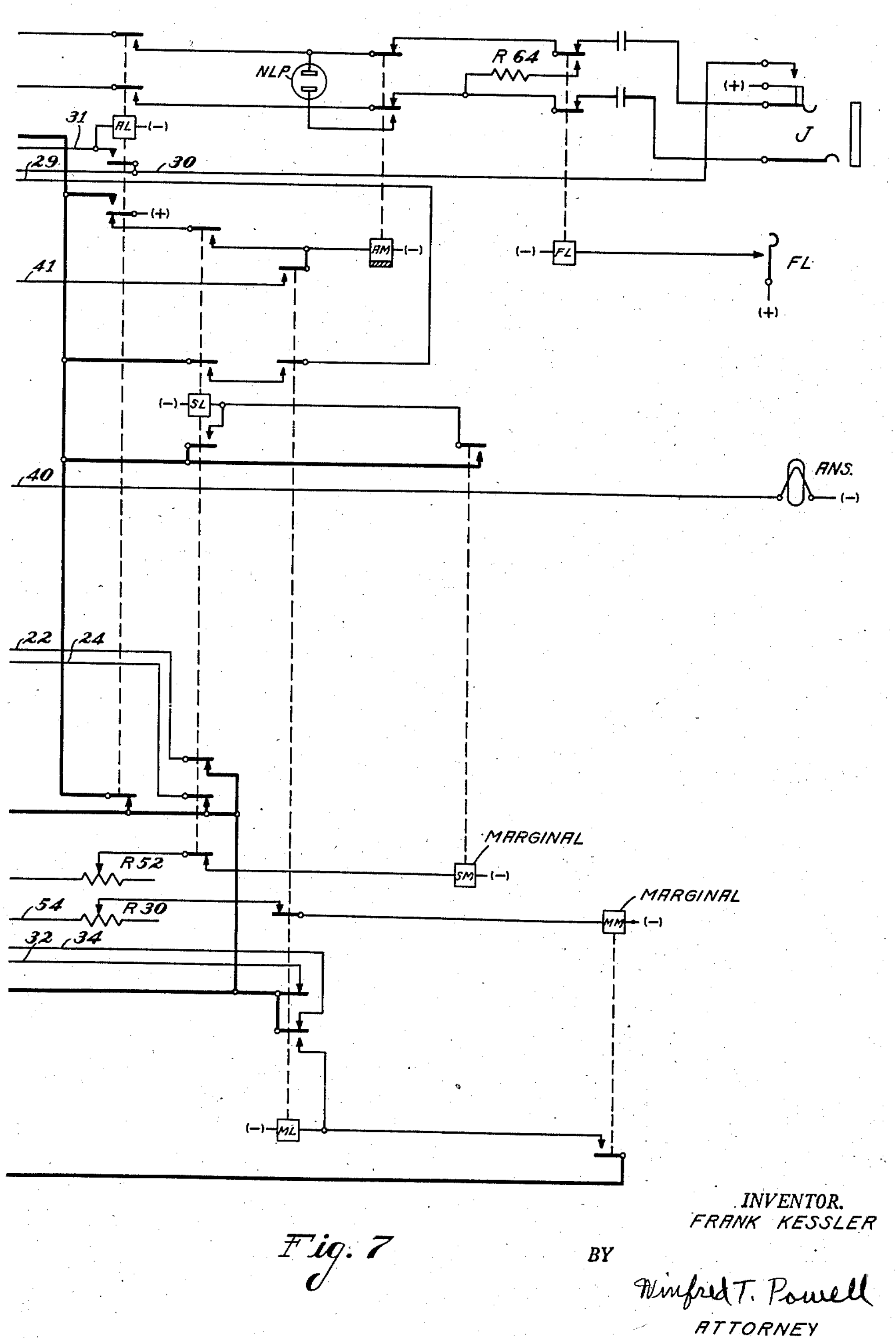

It is believed that the invention will be best understood by explaining in detail the circuit operation when a connection is established from a calling substation, such as substation A illustrated in the upper left-hand portion of Fig. 1, to a line circuit 27, illustrated in the upper left-hand portion of Fig. 3, assuming that the call is for a station which normally responds to the code ring applied from the common code ringing interrupter, which ring is selected by the station selector SS of the party line connector taking five steps. It will further be assumed that the station corresponding to this code ring is disconnected, as indicated by the cross connection of code jumper 1JM from the terminal of the brush B of the finder switch to the No. 5 terminal of the resistor unit R12 to R20 inclusive. It will be understood that the cross connecting jumper 1JM may be connected to any one of the ten cross connecting terminals for marking the particular code corresponding to a particular station of the indicated line which is on intercept. In this connection, it will be understood that brush 18 of station selector SS of the connector may be stepped to any one of the ten illustrated terminals to select the particular code corresponding to a particular station, as dialed by the calling subscriber for the last or code selecting digit of the complete called number. Brush 19 is stepped in synchronism with brush 18 for selectively inserting a resistance value, from zero to a maximum, of the units 12R to 20R in the HSL lead.

In order to more clearly explain the operation of the circuits to which the invention pertains, portions of the party line and individual line connectors have been shown in Fig. 1. Within the larger heavy line rectangle, the portion of the party line connector which is shown comprises a slow operate cut-in relay CI, a slow-acting trip relay TR, a station selecting switch SS of the well-known minor type and four brushes of the connector switch. The minor switch SS comprises two sets of bank contacts over which brushes 18 and 19 are stepped by the operating magnet OPER. when the station selecting digit of the called station is dialed, after the connector switch has been operated in response to the tens and units digit of the called line to associate tip brush TB, sleeve brush SB, ring brush RB and hunt sleeve brush HS of this connector with the terminals of the called line circuit. Release magnet RLS is also associated with the minor switch for releasing this switch when the connection is cleared out, the operating circuits for the release and operating magnets of the minor switch not being shown since these circuits may be arranged in accordance with conventional practice.

The common code ringing interrupter (not shown in detail) is started in operation when a connector switch connects (+) to the common start conductor leading to this interrupter. The code ringing interrupter applies the various ringing codes to the common code conductors C1 to C10 inclusive and these codes are selected for application to the called line by brush 18 of the minor switch. In this embodiment of the invention, the particular codes applied to the line perform no function in controlling the intercept circuit, this intercept circuit arrangement being responsive to the value of the resistance (including resistors 12R to 20R inclusive) for effecting the connection of the call to an operator's trunk when brush 19 is advanced to a point corresponding to a code combination selected by brush 18, when this combination is one associated with a station which has been removed and consequently which determines that the call should be intercepted.

The individual line connector, shown within the smaller full line rectangle just below the party line connector, has a similar set of brushes TB, SB, RB and HS, but this connector has no minor switch associated therewith, since it selects only individual lines. This individual line connector circuit extends the HS brush to a trunk hunt circuit when a P. B. X group is dialed and when the particular line of this group is busy, but since the circuits for performing this function are not related to the present invention, they have been omitted. The cut-in relay CI of the individual line connector applies (+) to the HS brush for a purpose corresponding to that of the CI relay of the party line connector, when this latter connector selects the first station on the called party line.

The equipment provided in the exchange for terminating line A may comprise a line switch or a line circuit and line finder, by means of which the calling line is extended to the selector, after which the selector may be operated from the calling dial for selecting other selectors or connectors, one connector being illustrated as selected from the selector banks by way of tip conductor TT, sleeve conductor ST and ring conductor RT. For terminating calls to line A, tip, ring and sleeve conductors T, R and S of the associated line circuit extend to connector banks in the conventional manner. Line circuit 17 may be an individual line, while line circuit 27 may be a party line, it being assumed that this latter line circuit has a station thereon which has been removed from service and consequently calls to this station are to be directed to an operator's trunk circuit.

When a station of a party line is to be placed on intercept, relays LA and LB are connected to this line as shown in the left-hand portion of Fig. 3 and jumper 1JM is connected between the B brush terminal of the finder switch and the numbered terminal leading to the group of resistors R12 to R20 inclusive, which corresponds to the number of the station digit associated with the intercepted substation. In the event that a second station of this same line is to be placed on intercept, then jumper 2JM connects the terminal of the finder switch to the numbered terminal of the resistor group R3 to R11 inclusive, the number of this terminal corresponding to the last digit of the number of the station for which calls are to be intercepted. In other words, calls for two stations on the same line may be intercepted by connecting a single line relay group comprising relays LA and LB to this line and connecting up both jumpers 1JM and 2JM to correspond to the last digits of these two stations, the common apparatus functioning to intercept calls to either station and to route these calls to the operator's trunk.

If an individual line is to be placed on intercept, the LA and LB relays are associated with this line and jumper 1JM is connected to the #1 terminal of the R12 to R20 group of resistors, since the CI relay of an individual line connector applies direct (+) by way of the HS brush to the circuit including the terminal and brush D of the intercept circuit finder switch, all in a manner which will be pointed out in detail. It will be understood that the trunk circuit connected to the switchboard jack J in the upper right-hand portion of Fig. 7 may be replaced by a tick-tick tone circuit, such as illustrated in Powell Patent 2,344,634 for audibly signaling the calling party to hang up and dial the information operator. It is not believed necessary to show or explain how the line switch, line finder, selector and connector circuits are operated for extending calls originated at station A to called line circuits such as 17 of Fig. 2 or 27 of Fig. 3, since all of these circuits may be arranged in accordance with conventional practice.

With the above general explanation, it will now be assumed that station A extends a call to line 27 and that this line is connected to the LA and LB relays, as shown, and that jumper 1JM of this individual intercept circuit is connected to terminal 5 as shown. It will further be assumed that the station digit dialed in response to a call to this line is 5 for associating brush 18 of the station selector with conductor C5 leading to the common code ringing interrupter and that the station responsive to the code applied to conductor C5 is disconnected from service. Furthermore, brush 19 of station selector SS will come to rest on its fifth terminal for connecting this brush to the point between resistors 15R and 16R.

When the intercepted line circuit is seized, (+) on the common pick-up conductor is extended thorugh the lower winding of relay CI of the conductor, brush SB and its associated terminal, conductor SL and winding of the cut-off relay (not shown) of the line circuit for operating this relay and for making this line busy to other calls, in the conventional manner. The pulse on the common pick-up conductor operates relay CI and this relay closes a locking circuit for itself at its X contact (contact X makes before any other contact of this relay is switched), this locking circuit being maintained until the connection is released. The operation of relay CI extends the tip and ring conductors TL and RL of the called line by way of the tip and ring brushes TB and RB of the connector to the ringing circuit. Although not shown, the operation of relay CI usually applies direct (+) to sleeve conductor SL for making the called line busy and for operating its cut-off relay after relay CI has been locked at its X contact.

A trip circuit is now prepared so that the ringing may be tripped and the called line circuit extended through to the talking circuit of the connector by way of make contacts of trip relay TR. This trip circuit is conventional and is not shown in detail, it being necessary only to point out that it extends from the selected code ringing conductor by way of brush 18, break contact of relay TR, make contact of relay CI, brush RB and its terminal, called line circuit, brush TB and its terminal, make contact of relay CI, break contact and upper winding of relay TR to (−). It will be understood that the removal of the receiver at the called station (when a station is called which is not on intercept) is effective to operate relay TR over the above described circuit during either the silient or the ringing interval. When relay TR is operated, it closes a locking circuit for itself at its X contact, this contact likewise being closed before any other contact of this relay is switched, thus maintaining relay TR locked until the connection is released. The locking circuits for the TR and CI relays are indicated in dotted lines since it is well known how these circuits are set up in accordance with conventional practice.

When the line circuit 27 is called and the intercepted station of this line is selected, relay CI of the connector is operated but relay TR is not operated by the removal of a receiver as above explained, since this call sends out a code for a station which is not connected to the called line.

Relay LA of the individual intercept circuit is wound and adjusted so that it will operate through the total resistance included in resistors 12R to 20R inclusive. Consequently, when the line is selected and the CI relay operates, (+) is applied to brush HS either by way of a direct connection or through one or more of the resistors 12R to 20R inclusive. Irrespective of the position taken by brush 19, the circuit extending from (+) by way of this brush and brush HS is extended to common conductor HSL, through the lower break contact of relay LB and the winding of relay LA to (−) for operating this latter relay.

The operation of relay LA closes a circuit for starting the finder switch associated with the common portion of the intercept equipment extending from (+), break contact of relay LB, make contact of relay LA, common conductor 21, break contact of relay SW, break contact and winding of the finder switch stepping magnet STR to (—). This circuit causes the finder switch stepping magnet to operate in a buzzer like manner for advancing its wipers A to F inclusive over the terminals of their banks (the terminals being connected to other individual intercept circuits when necessary). When brush A reaches the terminal associated with this particular line circuit, relay SW is operated for stopping the finder switch at the point associated with this particular line, this stopping circuit extending from the (+), break contact of test relay T, lower winding of relay SW, brush A and its associated contact, make contact of relay LA and lower winding of relay LB to (—). Relays LB and SW are operated in this circuit, relay LB closing a locking circuit for itself at its X make contact by way of its upper winding for holding this relay in its operated position to the circuit to (+) on sleeve conductor SL applied thereto by the connector switch. Relay SW closes a locking circuit for itself extending from (+), break contact of relay XMF, conductor 51, make contact of relay SW, break contact of relay SR, make contact and upper winding of relay SW to (—). It will be pointed out at this time that the circuit from (—) through resistor R1 and upper break contact of relay LB applied to conductor SL is for the purpose of providing a cut-through circuit for the connector, when such a connector requires (—) battery on its sleeve to operate the CI relay. The operation of relay LB opens up and releases relay LA.

The operation of relay SW opens up the circuit to test relay T so that this relay cannot be operated in the event that the test key should be operated during the time that the circuits are functioning in response to an intercepted call. Relay SW also applies (+) to the master ground conductor, shown in heavy lines, over a circuit extending from (+), break contact of relay XMF, conductor 51 and make contact of relay SW to the master ground conductor. This (+) on the master ground conductor is for the purpose of operating and locking certain relays of the common circuits as long as a call is extended to the intercept circuit or as long as the common circuits are operating through a cycle of operations.

Pulse generating relays PA and PB are of the slow operate type and operate in a self-interrupting manner to provide impulses for operating the various other relays of the circuit, including the chain of S counting relays SA to SK inclusive and the chain of M counting relays including relays MA to MK inclusive. In describing the operation of the pulse generating relays and the counting relays, it will be convenient to refer to the operations of the PB relay (which controls the counting relays) as going through a series of "off" and "on" periods. For example, the PB relay is normally de-energized to provide a normal "off" period. Then when relay PB is first energized the No. 1 "on" period is provided, followed by the No. 1 "off" period when relay PB is next released. After this the PB relay goes through a series of "on" and "off" periods from 2 "on"-2 "off" up to and including 10 "on," followed by its normal "off" period. The above assumes that the circuits go through a complete cycle of operations. In the event that a station on intercept is called, then the circuits will step to a predetermined "on" period, the SM and MM relays will operate to operate the SL and ML relays for stopping the step operation and for extending the call to the operator, in a manner later to be explained.

The circuits for the PA and PB pulse generating relays will now be described. When (+) is applied to the master ground conductor by the operation of relay SW, as above explained, a circuit may be traced from this master ground conductor, through the winding of relay PA and resistor R31 to (—) for operating relay PA. Relay PA closes a circuit from the master ground conductor, through the winding of relay PB and resistor R32 to (—) for operating relay PB for advancing the pulser circuit from the normal "off" to the No. 1 "on" period. The operation of relay PB short circuits and releases relay PA, which in turn short circuits and releases relay PB for advancing the pulser from the No. 1 "on" to the No. 1 "off" period. The release of relay PB removes the short circuit from relay PA, this relay again operates over the above-described circuit and again closes the above-described circuit for operating relay PB to advance the pulser from the No. 1 "off" to the No. 2 "on" period. The operation of relay PB short circuits and releases relay PA for again short circuiting and releasing relay PB for advancing the pulser circuit from the No. 2 "on" to the No. 2 "off" period. This pulsing operation of the PA and PB relays continues and at each "on" and "off" period certain relay operating circuits are completed as will later be described.

At the first operation of relay PB, master ground is extended to the winding of relay AN for operating this latter relay. Since relay AN is of the slow release type and since the PB relay is released for comparatively short time intervals during the pulsing operation, the AN relay will remain in its operated position throughout the cycle of operations or, in other words, relay AN is operated at the No. 1 "on" period and is maintained in its operated position throughout the following "off" and "on" periods of the pulsing cycle. Relay AN applies (+) to the master ground conductor for maintaining the circuits in a condition to permit the stepping relays to run through to the end of the cycle and clear out the common circuits, in the event that the calling subscriber should hang up and release the connection for releasing the LB and SW relays prematurely. In this connection, it will later be observed that relay XMF is operated to disconnect its (+) from the master ground conductor.

A circuit is now closed for operating the first relay SA of the S chain of counting relays, this circuit extending from (+) on the master ground conductor, break contact of relay AL, break contact of relay SL, conductor 22, make contact of relay PB, conductor 23, break contact of relay XSF, and winding of relay SA to (—). Relay SA closes a locking circuit for itself extending from the (+) on the master ground conductor, break contact of relay SL, conductor 24, make contact of relay PB, break contact of relay ST, conductor 20, break contact of relay SB, make contact and winding of relay SA to (—). It will be noted that this (+) on conductor 24 is extended through a break contact of relay ST to the left-hand terminal of the lower winding of this relay and, since the master ground conductor is connected to the right-hand terminal of this winding, the lower winding of relay ST is short circuited to prevent its operation at this time.

A circuit is now closed for operating relay XSF extending from (+) on the master ground conductor, make contact of relay SA and winding of relay XSF to (−). The operation of relay XSF closes a locking circuit for itself extending from (+) on the master ground conductor, make contact and winding of relay XSF to (−).

At the same time that relay SA is operated, a circuit is closed for operating relay MA extending from (+) on the master ground conductor, break contact of relay AL, break contact of relay ML, conductor 32, make contact of relay PB, conductor 33, break contact of relay XMF and winding of relay MA to (−). Relay MA closes a locking circuit for itself extending from (+) on the master ground conductor, break contact of relay ML, conductor 34, make contact of relay PB, conductor 25, break contact of relay MT, conductor 35, break contact of relay MB, make contact and winding of relay MA to (−). It will be noted that this connection from (+) on the master ground conductor extends to the right-hand terminal of the upper winding of relay MT and, since the master ground conductor is directly connected to the left-hand terminal of this winding, the MT relay is short circuited to prevent its operation at this time. The operation of relay MA closes a circuit for operating relay XMF extending from (+) on the master ground conductor, make contact of relay MA and winding of relay XMF to (−). Relay XMF closes a locking circuit for itself extending from the master ground conductor, make contact and winding of relay XMF to (−). The above operations of the AN, SA, XSF, MA and XMF relays have been effected in response to the operation of the PB relay in its No. 1 "on" period.

It will now be explained how the ST and MT relays operate and how the SA and MA relays are locked operated in response to the No. 1 "off" period of the cycle. When relay PB releases to mark the beginning of the No. 1 "off" period, a second locking circuit is closed for relay SA which may be traced from the master ground conductor, lower winding of relay ST, conductor 20, break contact of relay SB, make contact and winding of relay SA to (−). Since this locking circuit for the SA relay includes the lower winding of relay ST, this latter relay will be operated. A second locking circuit is closed at this same time for relay MA which may be traced from the master ground conductor, upper winding of relay MT, conductor 35, break contact of relay MB, make contact and winding of relay MA to (−). Since this locking circuit for the MA relay includes the upper winding of the MT relay, this latter relay is operated. It will be obvious that the above-described first locking circuits for the SA and MA relays are opened by the release of the PB relay, which at the same time includes the windings of the ST and MT relays in the second locking circuits for the SA and MA relays.

When the PB relay advances from the No. 1 "off" to the No. 2 "on" period, a locking circuit is closed for relay ST which may be traced from the master ground conductor, break contact of relay SL, conductor 24, make contact of relay PB, make contact and upper winding of relay ST to (−). At this same time a circuit is closed for operating relay SB extending from the master ground conductor, break contact of relay SL, conductor 22, make contact of relay PB, make contact of relay ST, conductor 28, make contact of relay SA and winding of relay SB to (−). The operation of relay SB opens up the above traced second locking circuit for relay SA for effecting the release of this latter relay. Relay SB closes a locking circuit for itself extending from the master ground conductor, break contact of relay SC, make contact and winding of relay SB to (−). A circuit is closed at this same time for operating relay MB extending from the master ground conductor, break contact of relay ML, conductor 32, make contact of relay PB, conductor 33, make contact of relay MT, make contact of relay MA and winding of relay MB to (−). The operation of relay MB opens up the second locking circuit for relay MA for effecting the release of this latter relay. Relay MB closes a locking circuit for itself extending from the master ground conductor, break contact of relay MC, make contact and winding of relay MB to (−).

When relay PB releases to mark the end of the No. 2 "on" period and the beginning of the No. 2 "off" period, the above described locking circuit for relay ST is opened for effecting the release of this latter relay. At this same time, the locking circuit for relay MT is opened for effecting the release of this latter relay.

The release of relay PB again effects the operation of relay PA, which in turn operates relay PB for marking the end of the No. 2 "off" period and the beginning of the No. 3 "on" period. A circuit is now closed for operating relay SC extending from the master ground conductor, break contact of relay SL, conductor 22, make contact of relay PB, break contact of relay ST, conductor 37, make contact of relay SB and winding of relay SC to (−). At this same time a circuit is closed for operating relay MC which extends from the master ground conductor, break contact of relay ML, conductor 32, make contact of relay PB, conductor 33, break contact of relay MT, conductor 48, make contact of relay MB and winding of relay MC to (−). Relay SC closes a first locking circuit for itself extending from the master ground conductor, break contact of relay SL, conductor 24, make contact of relay PB, break contact of relay ST (this circuit short circuiting the lower winding of relay ST to prevent its operation at this time), conductor 20, break contact of relay SD, conductor 36, make contact and winding of relay SC to (−). At this same time a first locking circuit is closed for relay MC extending from the master ground conductor, break contact of relay ML, conductor 34, make contact of relay PB, conductor 25, break contact of relay MT (this circuit short circuiting the upper winding of relay MT to prevent its operation at this time), conductor 35, break contact of relay MD, conductor 38, make contact and winding of relay MC to (−). The operation of relay SC opens the locking circuit for relay SB for effecting the release of this relay and the operation of relay MC opens the locking circuit for relay MB for effecting the release of this relay.

The operation of relay PB effects the release of relay PA, which in turn effects the release of relay PB to mark the end of the No. 3 "on" period and the beginning of the No. 3 "off" period. At this time a second locking circuit is closed for relay SC extending from the master ground conductor, lower winding of relay ST, conductor 20, break contact of relay SD, conductor 36, make contact and winding of relay SC to (−). Since this locking circuit includes the lower winding of relay ST, this latter relay is operated. The release of relay PB opens the above-described first locking circuit for relay SC. At this same time a second locking circuit is closed for relay MC extending from the master ground conductor, upper winding of relay MT, conductor 35, break contact of relay MD, conductor 38 make contact and winding of relay MC to (—). Since this locking circuit includes the upper winding of relay MT, this latter relay is operated. The release of relay PB opens the above-described first locking circuit for relay MC.

The release of relay PB effects the operation of relay PA and this relay in turn effects the operation of relay PB to mark the end of the No. 3 "off" period and the beginning of the No. 4 "on" period. A locking circuit for relay ST is closed at this time extending from the master ground conductor, break contact of relay SL, conductor 24, make contact of relay PB, make contact and upper winding of relay ST to (—). At this same time a locking circuit is closed for relay MT extending from the master ground conductor, break contact of relay ML, conductor 34, make contact of relay PB, conductor 25, make contact and lower winding of relay MT to (—). At this time a circuit is closed for operating relay SD extending from the master ground conductor, break contact of relay SL, conductor 22, make contact of relay PB, make contact of relay ST, conductor 28, make contact of relay SC, conductor 58 and winding of relay SD to (—). Relay SD closes a locking circuit for itself from the master ground conductor, break contact of relay SE, make contact and winding of relay SD to (—). The operation of relay SD opens up the above described second locking circuit for relay SC for effecting the release of this latter relay. At this same time a circuit is closed for operating relay MD extending from the master ground conductor, break contact of relay ML, conductor 32, make contact of relay PB, conductor 33, make contact of relay MT, conductor 68, make contact of relay MC, conductor 57 and winding of relay MD to (—). Relay MD closes a locking circuit for itself extending from the master ground conductor, break contact of relay ME, make contact and winding of relay MD to (—). The operation of relay MD opens up the above-described second locking circuit for relay MC for effecting the release of this latter relay.

The operation of relay PB effects the release of relay PA, which in turn effects the release of relay PB to mark the end of the No. 4 "on" period and the beginning of the No. 4 "off" period. The release of relay PB opens up the above described locking circuit for relay ST for effecting the release of this relay and at the same time, relay PB opens up the above-described locking circuit for relay MT for effecting the release of this latter relay.

The release of relay PB effects the operation of relay PA, which in turn effects the operation of relay PB to mark the end of the No. 4 "off" period and the beginning of the No. 5 "on" period. A circuit is closed at this time for operating relay SE extending from the master ground conductor, break contact of relay SL, conductor 22, make contact of relay PB, break contact of relay ST, conductor 37, make contact of relay SD and winding of relay SE to (—). Relay SE closes a first locking circuit for itself extending from the master ground conductor, break contact of relay SL, conductor 24, make contact of relay PB, break contact of relay ST, conductor 20, break contact of relay SF, make contact and winding of relay SE to (—). The operation of relay SE opens the above-described locking circuit for relay SD for effecting the release of this latter relay. At this same time a circuit is closed for operating relay ME extending from the master ground conductor, break contact of relay ML, conductor 32, make contact of relay PB, conductor 33, break contact of relay MT, conductor 48, make contact of relay MD and winding of relay ME to (—). Relay ME closes a first locking circuit for itself extending from the master ground conductor, break contact of relay ML, conductor 34, make contact of relay PB, conductor 25, break contact of relay MT, conductor 35, break contact of relay MF, make contact and winding of relay ME to (—). The operation of relay ME opens the above described locking circuit for relay MD for effecting the release of this latter relay.

It is believed that the above explanation is sufficient to indicate how the two chains of stepping relays SA to SK inclusive and MA to MK inclusive are stepped along in synchronism by means of pulses provided by the pulse generating relays PA and PB. Consequently, since the operating and locking circuits for the other stepping relays are similar to those already described, the circuits of the additional stepping relays will not be described in detail. From the above it will be seen that the SA and MA relays are operated during the No. 1 "on" period, the ST and MT relays are operated during the No. 1 "off" period, the SB and MB relays are operated and the SA and MA relays are released during the No. 2 "on" period and the ST and MT relays are released during the No. 2 "off" period. This same sequence of operations continues throughout the cycle with successive S and M relays being operated during successive "on" periods, with each relay of the counting chain being released by the operation of the next succeeding relay of the chain. Furthermore, the ST and MT relays are operated during the odd "off" periods and released during the even "off" periods for effecting control of the S and M counting relays.

Since it has been assumed that the No. 5 station on the called line is on intercept and since the stepping relays have been advanced to the fifth "on" period, it will now be explained how the circuits function to stop the stepping operation and to extend the connection to the operator's trunk. The operation of relay SA at the beginning of the stepping cycle inserts all of the resistors R43 to R52 inclusive in the circuit between relay SM and the resistors 12R to 20R inclusive of the connector. Similarly, the operation of relay MA at the beginning of the stepping cycle inserts all of the resistors R21 to R30 inclusive in circuit with the MM relay and the resistors R12 to R20 inclusive. As the S and M stepping relays advance throughout the cycle, one R resistor (R43 to R51 inclusive) and one resistor (R21 to R29 inclusive) are removed from the series circuit to the SM and MM relays. In other words, as stepping advances the resistances in series with the SM and MM relays are reduced in value.

Referring to Fig. 3, which shows in schematic form the resistors included in the SM and MM relay circuits, it will be pointed out that relay SM is so wound and adjusted that it will operate in series with the total resistance included in resistors R43 to R52 inclusive, if the SS brush 19 of the connector is connected directly to (+). The insertion of any resistance unit of the resistors 12R to 20R inclusive in series with the total resistance of the resistors R43 to R52 inclusive introduces sufficient resistance in the circuit of relay SM to render it non-operative. This is because this relay is marginal in its adjustment. The same holds true for the marginal relay MM, since this relay will operate in series with the total resistance included in the resistors R21 to R30 inclusive, but will not operate when the cross connection goes to a point which includes one or more of the resistors R12 to R20 inclusive.

In the above example, brush 19 of station selector SS is standing on its fifth terminal for including 4 resistors 12R to 15R inclusive in the circuit to (+). Consequently, relay SM will not operate during the above-described step-by-step operations of the S relay chain until this chain of relays reaches the No. 5 "on" period at which time relay SE is operated, as previously described, to include resistors R47 to R52 inclusive in the SM relay circuit and, since 4 of the resistor units (R43 to R46) have been removed from the circuit and 4 resistor units (12R to 15R) have been inserted in the circuit, the operation of relay SE allows sufficient current to flow through the winding of SM relay to operate this relay. The same holds true for the M relays, which remove the first 4 resistors R21 to R24 inclusive and include the remainder of the resistors R25 to R30 inclusive in the MM relay circuit when relay ME operates. Since the cross connection jumper 1JM is connected to terminal No. 5 for inserting 4 resistors R12 to R15 inclusive in this circuit, the current flow is of the proper value to operate the MM relay when relay ME is operated. It will thus be observed that the SM and MM relays operate in synchronism at the No. 5 "on" period of the cycle.

Relay SM closes a circuit for operating relay SL extending from the master ground conductor, make contact of relay SM and winding of relay SL to (−). Relay SL closes a locking circuit for itself from the master ground conductor, make contact and winding of relay SL to (−). The operation of relay MM closes a circuit for operating relay ML extending from the master ground conductor, make contact of relay MM and winding of relay ML to (−). Relay ML closes a locking circuit for itself extending from the master ground conductor, make contact and winding of relay ML to (−). The operation of relay SL opens up and releases relay SM and the operation of relay ML opens up and releases relay MM.

The operation of relay SL disconnects conductors 22 and 24 from the master ground conductor for preventing any further stepping operation of the S relay, since it is the (+) extended through these two conductors to make contacts of the PB relay which steps the S relays. Similarly, the operation of relay ML disconnects the master ground conductor from conductors 32 and 34 for stopping the step-by-step operations of the M relays, since it is the (+) applied to these two conductors which is extended through another pair of make contacts of the PB relay which steps the M relays. Consequently, the S and M relays are stopped at this point. The pulsing relays are stopped at this point by means of a circuit extending from (+) on the master ground conductor, make contact of relay SL, make contact of relay ML and conductor 29 to a point between the winding of relay PB and resistor R32 for short circuiting relay PB which is effective to prevent its operation after it has been released by the release of relay PA to mark the end of the No. 5 "on" period. The stopping of the PA and PB relays in their released positions opens up the circuit of relay AN and this relay is released after a time interval measured off by its slow acting characteristics. The release of relay AN removes (+) from the master ground conductor but before this happens, relay AE is operated over a circuit extending from (+), break contact of relay AL, make contact of relay SL, make contact of relay ML, conductor 41, make contact of relay ME, make contact of relay SE and winding of relay AE to (−). Relay AE connects (+) to the master ground conductor. The SE and ME relays remain operated by means of their locking circuits, the circuit for relay SE extending from the master ground conductor, lower winding of relay ST, conductor 20, break contact of relay SF, make contact and winding of relay SE to (−). Relay ST is operated in this circuit but performs no function at this time. The ME relay is locked operated over a circuit extending from the master ground conductor, upper winding of relay MT, conductor 35, break contact of relay MF, make contact and winding of relay ME to (−).

A circuit is now closed for operating relay AM extending from (+), break contact of relay AL, make contact of relay SL and winding of relay AM to (−). The answering lamp is lighted over a circuit extending from (+), make contact of relay AE (or any correspondence indicating relay AA to AK which may be operated), conductor 39, break contact of relay T, conductor 40 and answering lamp to (−). This is a signal for the operator to answer the call and when the call is answered by plugging into answering jack J, (+) is applied to conductor 30 and extends through make contact of relay AE (or any relay AA to AK inclusive) and conductor 31 to the winding of relay AL for operating this relay, which closes a locking circuit for itself including the local contact of jack J and make contact of relay AL.

The operation of relay AL connects the neon lamp NLP across the tip and ring conductors leading back to the connector by way of make contact of relay AL for tripping the ring in the connector used on this call. The operation of relay AL also opens up and releases relays AM and AE, the former disconnecting the neon lamp from the circuit and extending the circuit from the connector to the tip and ring of jack J by way of break contacts of flash relay FL and the two talking condensers. The release of relay AE opens up and extinguishes the answering lamp circuit. When the operator passes along the proper information to the calling party and removes the answering plug from the answering jack, relay AL is released for disconnecting (+) from the master ground conductor which effects the release of relays SL and ML. It will be obvious that the master ground conductor is now completely de-energized, since relays AL, AE, AN and SW have all been restored to normal as previously described. When the calling party disconnects, the connector removes (+) from sleeve conductor SL for releasing relay LB of the individual intercept line circuit.

From the above description it will be seen how the two chains of stepping relays are stopped when a point is reached where the station selector brush 19 marks a particular station to be called on a party line and a corresponding point is reached where the cross connection jumper 1JM matches the amount of resistance connected into circuit by brush 19, thus effecting the operation of both stopping relays SM and MM at the same point for stopping the stepping operations and for signaling the operator. It is believed obvious from the above description how other stations marked by the cross connection of jumper 1JM to other terminals will effect the stopping of the stepping operations and the signaling of the operator when a station is selected by the station selector SS that causes brush 19 to insert a resistor in circuit which matches that inserted by jumper 1JM.

It will now be explained how the circuits function on a call to a station on a line which is not on intercept. For this example, it will be assumed that line 27 is selected as before, that jumper 1JM is connected to terminal 5 as illustrated, but in this instance it will be assumed that the station digit dialed is No. 6. The S and M relays step through their cycles as before and when relay ME is operated at the beginning of the No. 5 "on" period, sufficient resistance is removed from the circuit of the MM relay to permit this relay to operate and close a circuit for operating and locking relay ML, after which relay MM is released as before. The operation of relay ML stops the stepping of the M relays at this point, as previously described, but since relay SL is not operated at this step, the pulse relay PB is not short circuited and these pulse generating relays continue for stepping the S relays another step in their cycle. Furthermore, the AM relay is not operated and, since the SL relay is not operated, there is no circuit through the make contacts of the SE and ME relays for operating the AE relay. Consequently, the ST relay is operated at the beginning of the No. 5 "off" period over a circuit extending from the master ground conductor, lower winding of relay ST, conductor 20, break contact of relay SF, make contact and winding of relay SE to (−), this circuit locking relay SE by means of its above-described second locking circuit. At this same time relay MT is operated and relay ME is locked operated over a circuit extending from the master ground conductor, upper winding of relay MT, conductor 35, break contact of relay MF, make conduct and winding of relay ME to (−). During the successive operations of the PB relay, relay MT is not short circuited and released since the short circuiting path including conductor 34 is now disconnected from the master ground conductor at the break contact of relay ML. Consequently, the M relay chain stops with the ME and MT relays operated and these relays remain operated until the connection is cleared out.

In this example the station selector SS placed its brush 19 on a higher numbered step than the jumper connection 1JM. Consequently, when the S relay chain advances to the point which will permit the SM relay to operate (in this example #6 "on") the operation of relay SM closes the above-described circuit for operating and locking relay SL, after which relay SM is released. Relay AM is also operated in this example by way of a make contact of relay SL but relay AL cannot be operated because its circuit is not completed by the operation of any relay AA to AK inclusive, because there is no step during the cycle when the SL and SM relays are both operated at the same time that corresponding S and M counting relays are operated.

Since the chain of M relays stopped at the fifth step and since the chain of S relays stopped at the sixth step (out of correspondence) none of the A relays from AA to AK inclusive is operated for signaling the operator or for applying (+) to the master ground conductor. The pulse generating relays are stopped in the next "off" period (No. 6 "off") by means of a circuit extending from the master ground conductor, make contact of relay SL, make contact of relay ML, conductor 29 to the point between the winding of relay PB and resistor R32 for short circuiting and preventing the operation of the PB relay and consequently preventing the continued operation of the PA relay. Since the SL and ML relays are operated and conductors 22, 24, 32 and 34 are disconnected from the master ground conductor, the stepping relays are stopped and since relay PB remains de-energized for a comparatively long time interval, relay AN is released for disconnecting (+) from the master ground conductor, thus restoring the circuits to normal. The release of relay AN effects the release of relay SW in the manner previously described, as well as releasing relays XSF and XMF because (+) is disconnected from the master ground conductor. For the same reason, relays SL, ML and AM are released. Since relay XMF is slow releasing, and since this relay applied (+) to the locking circuit for relay SW at its break contact, the common circuits are placed in condition for handling the next call after the last relay (XMF) of the common group is released.

The above explanation pointed out the sequence of operations when the M relay counting chain stops at a point in advance of the S relay counting chain. If this order is reversed, that is the S relay counting chain is stopped at a point in advance of the M relay counting chain, the circuits function in a similar manner, except that relays SM and SL are operated before relays MM and ML. In this instance, however, there is no correspondence between the S and M relays at a particular step, consequently, no A relay is operated to signal the operator and the AL relay cannot be operated to trip the ring. Also in this instance, when both the SL and ML relays are operated, the short circuit is applied to relay PB for stopping the pulse generating operation, for releasing relay AN and for clearing out the circuit as previously described.

In the event that a call is established to the intercept circuit and the calling party disconnects before the S and M stepping relay chains have performed their functions to determine whether the call is for an intercepted station or not, the M relay chain will be stopped at the point marked by the cross connection but the S relay chain will not be stopped because the circuit to the resistor group 12R to 20R inclusive is interrupted at the HS brush of the connector. Furthermore, the LB relay will be released but the SW relay of the common intercept circuit will not be released because the pulse generating relays continue to operate and hold relay AN in its operated position until the end of the cycle. When the M relays reach the end of the cycle and relay MK is operated and locked, a circuit is closed for operating relay MM extending from the master ground conductor, make contact of relay MK, conductor 54, resistor R30, break contact of relay ML and winding of relay MM to (−). Relay MM closes the previously described operating and locking circuits for relay ML and since relay SL has already been operated earlier in the cycle, the above-described circuit is now completed for short circuiting relay PB to stop the pulse generating operation and to release relay AN for clearing out the circuit.

In the event that the call to the intercepted station is from a toll operator's position or the like, and since there is no means in the common intercept circuit or the particular operator's trunk illustrated for providing supervision when the call is answered, flash key FL and flash relay FL have been provided to enable the intercepting operator to flash back to the toll operator that the called station is on intercept. It will be obvious that answering supervision should not be provided on a trunk circuit of this kind, such as the trunk circuit leading to jack J, because this would operate a meter or coin collect device falsely when a call from a metered station or a coin box station was extended to an intercepted station, with the circuits functioning as above described. Consequently, when the intercept operator determines that the call comes from a toll trunk or the like, flash key FL may be intermittently operated for intermittently operating relay FL, this relay in turn placing a closed circuit across the terminating connection from the connector by way of resistor R64 for transmitting flash signals to the originating operator's position.

In the event that an individual line is placed on intercept, then when the individual line connector illustrated in Fig. 1 selects this particular line circuit, the LB and LA relays of the individual intercept circuit associated with this line are operated in the previously described manner to cause the finder switch to select this particular line. When the CI relay of the connector is operated, direct (+) is applied by way of connector brush HS and conductor HSL to the circuit leading to the resistors R43 to R52 inclusive controlled by the S counting relays. Since there is no external resistance in the lead connected to the HS brush, when the first S relay (SA) is operated sufficient current flows through the series of resistors for operating relay SM. In connection with individual lines, jumper 1JM is connected to the No. 1 terminal of the R12 to R20 resistor group, thus applying direct (+) to the series of resistors R21 and R30 inclusive selected by the M counting relays. Consequently, the MM relay is operated at the first step. With the SM and MM relays operated, relays SL and ML are operated as previously described to stop the stepping and to stop the pulse generating relays. Since correspondence between the S and M relays is attained at the first step, relay AA is operated to operate the answering lamp and when the call is answered the ring is tripped and the circuit is extended to the intercept operator's trunk circuit, all in the previously described manner.

Since there is no code selection provided in connection with a call to an individual line, two or more individual lines may be connected in multiple to a particular set of terminals on the finder switch bank to provide intercept service in the above-described manner when any one of these individual lines is called. It will be understood that in this type of service, when one individual line is called which is connected in multiple with one or more additional individual lines, all other lines of the intercepted group connected to the same terminals of the finder switch will be made busy as long as there is a connection established to one of these lines. This is in accordance with conventional practice.

With the circuits at rest, the attendant can make a test of their operation and, by means of the white and green lamps WH and GR, determine if they are functioning properly. To effect this test the test key is operated for closing a circuit from (+), make contact of the test key, break contact of relay SW and winding of test relay T to (−). Relay T closes an obvious locking circuit for itself which is maintained complete as long as the test key is actuated. Relay T opens up the operating circuit of the lower winding of relay SW so that this circuit cannot be completed to a line on intercept which is called during this testing operation. Relay T closes an obvious circuit through the upper winding of relay SW for operating this relay, relay SW being locked operated as previously described.

Relay T opens up the above-described circuit to the answering lamp so that this signal will not be falsely operated while this test is being effected. Relay T applies (+) to conductor 42 for operating the white and green lamps when the second S and M relays SB and MB are operated. Relay T opens up the circuit leading to the finder switch brush D and connects (+) through resistor R2 and conductor 45 to the SM relay circuit. Relay T also opens up the circuit to brush B of the finder switch and connects resistor R12 in the circuit extending by way of conductor 43 to relay MM. The values of resistors R12 and R2 are equal so that when the S and M counting relays take two steps relays SM and MM will operate in synchronism for operating relays SL and ML to stop the stepping and the operation of the pulse generating relays.

With relay SW operated and locked, (+) is applied to the master ground conductor for operating the pulse generating relays PA and PB, for operating relay AN and for operating the S and M counting relays, all as previously described. When relays SB and MB have been operated, (+) on conductor 42 is effective to light the white and green lamps WH and GR respectively as an indication that the circuits are functioning properly. The stepping will be stopped at the second step because the SL and ML relays are operated by the respective operations of relays SM and MM.

The circuit for operating relay SM may be traced from (+), resistor R2, make contact of relay T, conductor 45, make contact of relay SB, resistors R44 to R52 inclusive, break contact of relay SL and winding of relay SM to (−). The circuit for operating relay MM may be traced from (+), resistor R12, make contact of relay T, conductor 43, make contact of relay MB, resistors R22 to R30 inclusive, break contact of relay ML and winding of relay MM to (−).

Relays SL and ML are operated and locked by the operations of relays SM and MM in the previously described manner. It will be observed that corresponding relays in the S and M groups of counting relays are operated at the same time and that relays SL and ML are operated at this time. To prevent the operation of relay AB, its operating circuit is opened by disconnecting conductor 46 from conductor 47 at a break contact of relay T. Relay AB is prevented from operating under this condition to prevent the application of (+) to the master ground conductor, which would provide a lock-up circuit for the equipment and prevent its release when the key is restored to normal.

When the test key is restored to normal, relay T is released for releasing relay SW. Since the release of relay T disconnects (+) from the master ground conductor, including a break contact of relay SR, and since the pulse generating relays have been stopped to effect the release of relay AN, the master ground conductor is cleared from all connections to (+) for effecting the release of the circuits and restoring them to their normal condition. It will be obvious that the pulse generating relays are stopped by the operation of relays SL and ML extending the master ground conductor by way of conductor 29 for short circuiting relay PB and preventing its further operation.

It will now be explained how the circuits function when a second party of a party line is connected to have calls to this station intercepted. In describing this feature of the invention, it will be assumed that jumper 1JM is connected to terminal No. 5 for intercepting calls to station No. 5 and that jumper 2JM is connected to terminal No. 2, leading to the point between resistors R3 and R4, for intercepting calls to station No. 2 on the same line with station No. 5. When the line is selected, the LA relay operates to cause the finder, including stepping magnet STR, to advance to this line and operate relays LB and SW, after which relay LA is released, all in the previously described manner. Relay SW closes a locking circuit for itself extending from (+), break contact of relay XMF, conductor 51, make contact of relay SW, break contact of relay SR, make contact and upper winding of relay SW to (—). This circuit from (+) is applied to the master ground conductor by the operation of relay SW. A circuit is now closed for operating relay SP extending from (+), resistor R3, terminal No. 2 of the resistor group and the terminal of the line switch bank, brush C, make contact of relay SW, break contact of relay SS and winding of relay SP to (—). It will be pointed out at this time that relay SP is a sensitive relay and will operate through the total resistance of resistors R3 to R11 inclusive, thus operating this relay when jumper 2JM is connected to any of the terminals 1 to 10 inclusive of the R3—R11 resistor group. Relay SP closes an obvious circuit for operating relay SR.

With (+) applied to the master ground conductor, relays PA and PB are intermittently operated and released for generating the pulses for operating the S and M relays of the two counting chains in the previously described manner. Relay PB extends the master ground conductor to relay AN for operating this relay, which remains in its operated position throughout the cycle. Relay AN applies (+) to the master ground conductor for maintaining this conductor connected to (+) throughout the remaining portion of the cycle. Relay SR transfers the locking circuit of relay SW from the master ground conductor to (+) at the make contact of relay SR.

Relays SA and MA are operated and locked during the No. 1 "on" period and released during the No. 2 "on" period and relays SB and MB are operated in the No. 2 "on" period for releasing relays SA and MA and relays ST and MT are operated in the No. 1 "off" period. Relay XMF is operated and locked and relay XSF is operated and locked when the MA and SA relays operate in the No. 1 "on" period. The operation of relay XMF disconnects (+) from the circuit extending to the master ground conductor by way of the make contact of relay SW, but this master ground conductor is connected to (+) at a make contact of relay AN before relay XMF is operated, all in the previously described manner. With relays SR and AN operated, a circuit is closed for operating relay AP extending from the master ground conductor, make contact of relay SR, conductor 55, make contact of relay AN and winding of relay AP to (—). Relay AP closes a locking circuit for itself extending from the master ground conductor, make contact of relay SR, conductor 55, make contact and winding of relay AP to (—).

The circuits run through the cycle in the previously described manner, except in this instance relays SP, SR and AP are in their operated positions. Conductor 43, which leads to the winding of relay MM, is extended by way of break contacts of relays T and SS to jumper 1JM and thence through terminal 5 and resistors R15, R14, R13 and R12 to (+) for operating relay MM at the fifth step in the previously described manner. If the station selector SS is set on the fifth step, then correspondence will be attained at this step, the ring will be tripped and the connection extended to the intercept operator in the previously described manner. If the station selector is not set on the fifth step then the circuits will run through the cycle with the M counting relays being stopped at the fifth step but the S counting relays will be stopped at some other step, thus preventing the ring being tripped and preventing the connection of the circuit to the intercept operator and in this case the circuits will be cleared out as previously described.

When the circuits are released, relay SW is not released because relay SP remains operated for operating relay SR and this relay in turn maintains relay SW locked by way of its upper winding. At the end of the cycle, relay AN releases to disconnect (+) from the master ground conductor for clearing out the circuits. When relay XMF is released a circuit is closed for operating relay SS extending from (+), break contact of relay XMF, break contact of relay AN, make contact of relay AP (not released until after relay XMF is released because of the extra long release time of relay AP), conductor 53 make contact of relay SR and upper winding of relay SS to (—). The operation of relay SS closes a locking circuit for itself extending from (+), break contact of relay XMF, conductor 51, make contact of relay SW, master ground conductor, make contact and lower winding of relay SS to (—). Since relay XMF again applies (+) to the master ground conductor, the pulse generating relays PA and PB will again function and the stepping cycle will be repeated.

The operation of relay SS disconnects the conductor leading to brush C of the finder from the winding of relay SP and connects this conductor by way of a break contact of relay T and conductor 43 to the test circuit for the MM relay. Relay SS also connects the master ground conductor to the winding of relay SP for holding this relay and relay SR in their operated positions. Relay AP will remain locked operated over its previously described locking circuit but the circuit through its lower make contact to the winding of relay SS is maintained open at the break contact of relay AN and the break contact of relay XMF. Consequently, at the end of this second cycle, the (+) applied through the break contacts of relays XMF and AN and the make contacts of relays AP and SR is extended to the winding of relay SS but this pulse performs no function at this time, because relay AN will be released when the pulse generating relays are stopped for removing (+) from the master ground conductor for effecting the release of relays SP, SR and SS.

Since the second cycle operates with relay SS operated, relay MM is extended to jumper 2JM by way of conductor 43, break contact of relay T, make contact of relay SS, make contact of relay SW and brush C of the finder switch. The circuits therefore run through the second cycle and the test circuit to relay MM is controlled by the jumper connection of jumper 2JM. In this example, relay MM will be operated at the second step because jumper 2JM is connected to the No. 2 terminal of the R3—R11 resistor group and if the connector switch SS is on its second step, then the correspondence condition between the S and M relays will be effective to operate the AB relay for tripping the ring and signaling the operator. The circuits will then be cleared out when the operator disconnects and the calling party hangs up. If the station selector switch SS is not on the second step, then the M chain of counting relays will be stopped on the second step while the S chain of the counting relays will be stopped on some other step, out of correspondence, for stopping the pulse generating relays and clearing out the circuits in the previously described manner. It will thus be seen that, when two stations of a particular party line are connected for intercept service, the intercept circuits will function first to test the one marked by jumper 1JM during one cycle and thereafter the circuits will run through a second cycle for testing to determine the stopping point marked by jumper 2JM, after which the circuits are cleared out for use in connection with another call.

Although not so limited it is proposed to provide 20 intercept line circuits comprising LA and LB relays connected to the twenty terminals of the finder switch controlled by stepper STR, with these twenty circuits being in one common group for selecting a trunk to an intercept operator by means of the common circuits associated with this finder. Another group of twenty, or less, intercept line circuits may be connected to terminals of another finder switch having a separate set of common circuits similar to those illustrated in Figs. 2–7 inclusive for handling other intercept calls and extending them to another operator's trunk. It will be obvious that the switchboard termination may be either a jack-ended trunk as shown or a key-ended trunk. It is believed that the above explanation is sufficient to indicate how the circuits function to intercept calls under various operating conditions in accordance with the cross connection of one or more jumpers.

Having described an intercept system as particularly adaptable for selective type communication service in individual or party line ringing systems, when the party line systems are of the code ringing type, it is desired to have it understood that this form is selected to facilitate in the disclosure of the invention rather than to limit the number of forms which it may assume; and it is to be further understood that various modifications, adaptations and alterations may be applied to the specific form shown to meet the requirements of practice, without in any manner departing from the spirit or scope of the invention except as limited by the appended claims. For example, since it is the matched or correspondence condition between the cross connection jumper and the position taken by the station selector of the connector that determines the response of the common intercept circuit, with the station signal which is applied to the called line having nothing to do with this response, any type of station signaling can be used, such as code, harmonic, pulsating or the like.

What I claim is:

1. In a call intercepting system for telephone lines, a call intercepting trunk, an impulse generating circuit, a first and a second group of impulse counting relays operated in synchronism by said impulse generating circuit, means for stopping said first and second groups of counting relays at any one of a plurality of steps, and means responsive to the stopping of said first and second groups of counting relays at the same step for connecting a calling telephone line to said call intercepting circuit.

2. In a call intercepting system for telephone lines, a call intercepting trunk, an impulse generating circuit, a first and a second group of impulse counting relays operated in synchronism by said impulse generating circuit, means including a stop relay associated with each of said groups of counting relays for stopping each of said first and second groups of counting relays at any one of a plurality of steps, and means responsive to the stopping of said first and second groups of counting relays at the same step for connecting a calling telephone line to said call intercepting circuit.

3. In a call intercepting circuit for telephone lines, means for extending a connection to said intercepting circuit, an impulse generating relay associated with said intercepting circuit, a pair of counting relay chains operated in synchronism for counting the impulses generated by said impulse generating relay, a first test circuit including contacts of the first of said counting relay chains for controlling the stopping of said first pair of counting relay chains, a second test circuit including contacts of the second of said counting relay chains for controlling the stopping of said second pair of counting relay chains, and means controlled in response to the stopping of both of said counting relay chains at a predetermined point for intercepting a call to one of said telephone lines.

4. In a call intercepting circuit for telephone lines, means for extending a connection to said intercepting circuit, an impulse generating relay associated with said intercepting circuit, a pair of counting relay chains operated in synchronism for counting the impulses generated by said impulse generating relay, a first test circuit including contacts of the first of said counting relay chains for controlling the stopping of said first pair of counting relay chains, a second test circuit including contacts of the second of said counting relay chains for controlling the stopping of said second pair of counting relay chains, and means controlled in response to the stopping of both of said counting relay chains at a predetermined point for intercepting a call to one of said telephone lines and extending said connection to an intercept operator.

5. In a call intercepting circuit for telephone lines, means for extending a connection to said intercepting circuit, an impulse generating relay associated with said intercepting circuit, a pair of counting relay chains operated in synchronism for counting the impulses generated by said impulse generating relay, a first test circuit including contacts of the first of said counting relay chains for controlling the stopping of said first pair of counting relay chains, a second test circuit including contacts of the second of said counting relay chains for controlling the stopping of said second pair of counting relay chains, means controlled in response to the stopping of both of said counting relay chains at a predetermined point for intercepting a call to one of said telephone lines and extending said connection to an intercept operator, and means controlled in response to the stopping of both of said counting relay chains at any step except said predetermined step for releasing said connection.

6. In a call intercepting system for telephone lines, station selecting means for selecting the stations of said lines to be signaled, a call intercepting trunk, a first test circuit and a second test circuit, a first test relay and a second test relay associated with said first and said second test circuits respectively, a variable resistance in each of said test circuits, means responsive to the operation of said station selecting means for controlling the value of the variable resistance in said first test circuit, cross connecting means for selectively controlling the value of the variable resistance in said second test circuit, means responsive to a connection from a calling station to one of said lines for sequentially reducing the value of the resistances in both of said test circuits to a predetermined value, and means responsive to the resistances in both of said test circuits reaching the same predetermined value at the same time for extending said connection to said call intercepting trunk.

7. In a call intercepting system for telephone lines, station selecting means for selecting the stations of said lines to be signaled, a call intercepting trunk, a first test circuit and a second test circuit, a first test relay and a second test relay associated with said first and said second test circuits respectively, a variable resistance in each of said test circuits, means responsive to the operation of said station selecting means for controlling the value of the variable resistance in said first test circuit, cross connecting means for selectively controlling the value of the variable resistance in said second test circuit, means responsive to a connection from a calling station to one of said lines for sequentially changing the value of the resistances in both of said test circuits to a predetermined value, and means responsive to the resistances in both of said test circuits reaching the same predetermined value at the same time for extending said connection to said call intercepting trunk.

8. In a call intercepting system for telephone lines, station selecting means for selecting the stations of said lines to be signaled, a call intercepting trunk, a first test circuit and a second test circuit, a first test relay and a second test relay associated with said first and said second test circuits respectively, a variable resistance in each of said test circuits, means responsive to the operation of said station selecting means for controlling the value of the variable resistance in said first test circuit, cross connecting means for selectively controlling the value of the variable resistance in said second test circuit, means responsive to a connection from a calling station to one of said lines for sequentially changing the value of the resistances in both of said test circuits to a first predetermined value, means responsive to a connection established to said one of said lines for sequentially changing the value of the resistances to a second predetermined value, means responsive to the resistances in both of said test circuits reaching the same first predetermined value or the same second predetermined value at the same time for extending said connection to said call intercepting trunk.

9. In a call intercepting system for telephone lines, station selecting means for selecting the stations of said lines to be signaled, a call intercepting trunk, a first test circuit and a second test circuit, a first test relay and a second test relay associated with said first and said second test circuits respectively, a variable resistance in each of said test circuits, means responsive to the operation of said station selecting means for controlling the value of the variable resistance in said first test circuit, cross connecting means for selectively controlling the value of the variable resistance in said second test circuit, means responsive to a connection from a calling station to one of said lines for sequentially reducing the value of the resistances in both of said test circuits to a predetermined value, means responsive to the resistances in both of said test circuits reaching the same predetermined value at the same time for extending said connection to said call intercepting trunk, and means associated with said call intercepting trunk for signaling said calling station.

10. In a telephone system including a calling line and a called line, ringing apparatus for providing station ringing signals for said called line, station selecting means for selecting said station ringing signals for application to said line, means including said station selecting means for impressing said station ringing signals on said line, a call intercepting circuit, means inclusive of said station selecting means but exclusive of said station ringing signals selected thereby for causing said intercepting circuit to intercept a call to said line, and means associated with said intercepting circuit for momentarily closing a circuit for discontinuing the ringing signal applied to said line.

11. In a call intercepting system for telephone lines, station selecting means for selecting the stations of said lines to be signaled, a call intercepting trunk, a first test circuit and a second test circuit, a first test relay and a second test relay operatively associated with said first and said second test circuits respectively, a variable resistance in each of said test circuits, means responsive to the operation of said station selecting means for controlling the value of the variable resistance in said first test circuit, means for selectively adjusting the value of the variable resistance in said second test circuit, means responsive to a connection from a calling station to one of said lines for automatically and sequentially reducing the value of the resistances in both of said test circuits, and means responsive to the reduction of the resistances in both of said test circuits to predetermined values at the same time for extending said connection to said call intercepting trunk.

12. In a call intercepting system for telephone lines, station selecting means for selecting the stations of said lines to be signaled, a call intercepting trunk, a first test circuit and a second test circuit, a first test relay and a second test relay operatively associated with said first and said second test circuits respectively, a variable impedance in each of said test circuits, means responsive to the operation of said station selecting means for controlling the value of the variable impedance in said first test circuit, means for selectively adjusting the value of the variable impedance in said second test circuit, means responsive to a connection from a calling station to one of said lines for automatically and sequentially reducing the value of the impedances in both of said test circuits, and means responsive to the reduction of the impedances in both of said test circuits to predetermined values at the same time for extending said connection to said call intercepting trunk.

13. In a telephone system including a line, ringing apparatus for providing station ringing signals for the line, station selecting means responsive to the extension of a call to said line for selecting said station ringing signals for application to said line, means including said station selecting means for impressing any one of said station ringing signals on said line, a call intercepting circuit, a first impedance element having a plurality of impedance values variably selectable, a second impedance element having a plurality of impedance values variably selectable, means including said station selecting means for selecting a value of said first impedance element which is representative of a particular station ringing signal impressed on said line, means for selecting a value of said second impedance element which is representative of a station on said line which is to have calls therefor intercepted, means for making tests of the values of said first and said second selected impedance elements, and means responsive to a predetermined relationship between the values indicated by said tests for causing said intercepting circuit to intercept a call to said line.

14. In a telephone system including a line, ringing apparatus for providing station ringing signals representative of a plurality of stations on the line, station selecting means responsive to the extension of a call to said line for selecting any one of said station ringing signals for application to said line, means including said station selecting means for impressing any one of said selected station ringing signals on said line, a call intercepting circuit, a first impedance element having a plurality of impedance values variably selectable, a second impedance element having a plurality of impedance values variably selectable, means including said station selecting means for selecting a value of said first impedance element which is representative of any one of the station ringing signals impressed on said line, means for selecting a value of said second impedance element which is representative of a station on said line which is to have calls therefor intercepted, means for making tests of the values of said first and said second selected impedance elements, and means responsive to a predetermined relationship between the values indicated by said tests for causing said intercepting circuit to intercept calls to certain stations on said line.

15. In a telephone system including a line, ringing apparatus for providing station ringing signals representative of a plurality of stations on the line, station selecting means responsive to the extension of a call to said line for selecting any one of said station ringing signals for application to said line, means including said station selecting means for impressing any one of said selected station ringing signals on said line, a call intercepting circuit, a first impedance element having a plurality of impedance values variably selectable, a second impedance element having a plurality of impedance values variably selectable, means including said station selecting means for selecting a value of said first impedance element which is representative of any one of the station ringing signals impressed on said line, cross connecting means for selecting a value of said second impedance element which is representative of a station on said line which is to have calls therefor intercepted, means for making tests of the values of said first and said second selected impedance elements, and means responsive to a predetermined relationship between the values indicated by said tests for causing said intercepting circuit to intercept calls to certain stations on said line.

16. In a telephone system, a multi-party line, ringing apparatus for generating ringing signals designating different stations on said line, an automatic switch having access to line terminals connected to said line and including means for choosing a ringing signal for transmission over said line, a call intercepting circuit, an intercept marking terminal corresponding to a substation on said line, a marking circuit, means including said ringing signal choosing means for selectively connecting said marking circuit to said intercept marking terminal, a plurality of impedances, means for selecting a first impedance having a value which is representative of the station selecting signal selected, means for selecting a second impedance having a value which is representative of the station for which calls are to be intercepted, and means including said marking circuit responsive to a predetermined relationship between the values of said first and said second impedances for causing a call routed through said switch to said line to be intercepted by said call intercepting circuit.

17. In a telephone system, a multi-party line, ringing apparatus for generating ringing signals designating different stations on said line, an automatic switch having access to line terminals connected to said line and including means for choosing a ringing signal for transmission over said line, a call intercepting circuit, a marking circuit, means including said ringing signal choosing means for selectively connecting said marking circuit to said intercept marking terminal, a plurality of impedances, means for selecting a first impedance having a value which is representative of the station selecting signal selected, means for selecting a second impedance having a value which is representative of the station for which calls are to be intercepted, and means including said marking circuit and exclusive of said line terminals responsive to a predetermined relationship between the values of said first and said second impedances for causing a call routed through said switch to said line to be intercepted by said call intercepting circuit.

FRANK KESSLER.

REFERENCES CITED

The following references are of record in the file of this patent:

UNITED STATES PATENTS

| Number | Name | Date |
|---|---|---|
| 1,727,137 | Stehlik | Sept. 3, 1929 |